US011883998B2

(12) United States Patent
Steger et al.

(10) Patent No.: US 11,883,998 B2
(45) Date of Patent: Jan. 30, 2024

(54) APPARATUS AND METHOD FOR PRODUCING PLASTIC CONTAINERS WITH NON-CIRCULAR CROSS-SECTIONS

(71) Applicant: KRONES AG, Neutraubling (DE)

(72) Inventors: Sebastian Steger, Regensburg (DE); Gerhard Schwoed, Alteglofsheim (DE); Michael Eifler, Bernhardswald (DE); Jochen Forsthoevel, Regensburg (DE); Thomas Philipp, Eilsbrunn (DE); Simon Moewes, Regensburg (DE)

(73) Assignee: KRONES AG

( * ) Notice: Subject to any disclaimer, the term of this patent is extended or adjusted under 35 U.S.C. 154(b) by 0 days.

(21) Appl. No.: 17/942,968

(22) Filed: Sep. 12, 2022

(65) Prior Publication Data

US 2023/0191684 A1   Jun. 22, 2023

(30) Foreign Application Priority Data

Dec. 20, 2021  (DE) ..................... 10 2021 133 797.6

(51) Int. Cl.
*B29C 49/42* (2006.01)
*B29C 49/64* (2006.01)
*B29L 31/00* (2006.01)

(52) U.S. Cl.
CPC ............... *B29C 49/42119* (2022.05); *B29C 49/42065* (2022.05); *B29C 49/42101* (2022.05); *B29C 49/6418* (2013.01); *B29L 2031/712* (2013.01)

(58) Field of Classification Search
CPC ............ B29C 49/6418; B29C 49/6427; B29C 49/6435; B29C 49/6458; B29C 49/645;
(Continued)

(56) References Cited

U.S. PATENT DOCUMENTS

| 5,035,603 A | 7/1991 | Unterlander et al. ........ 425/522 |
| 6,514,448 B1 * | 2/2003 | Vogel .................. B29C 49/6436 425/534 |

(Continued)

FOREIGN PATENT DOCUMENTS

| DE | 19647260 | 8/2007 | ............... B65D 1/02 |
| DE | 102006047150 | 4/2008 | ............. G01N 21/90 |

(Continued)

OTHER PUBLICATIONS

Mechanical translation of Hüttner et al (DE 10 2014 118 292 A1) dated Jun. 2016. (Year: 2016).*

(Continued)

*Primary Examiner* — Robert B Davis
(74) *Attorney, Agent, or Firm* — HAYES SOLOWAY P.C.

(57) ABSTRACT

Apparatus for producing plastic containers has a heating device having a transport device for transporting the plastic preforms singly along a predefined transport path. The transport device has a plurality of holding devices for holding the plastic preforms, and at least one heating unit for heating the plastic preforms, wherein furthermore a rotating device is provided which rotates the plastic preforms held by the holding devices and is connected to a forming device, which transforms the plastic preforms transported by the heating device into plastic containers. The apparatus has an alignment device which enables alignment of the rotational position of the plastic preforms with respect to their longitudinal direction relative to the holding devices holding these plastic preforms and/or the apparatus has a rotational position alignment device arranged along the transport path which enables alignment of a rotational position of the holding devices with the plastic preforms arranged thereon.

20 Claims, 2 Drawing Sheets

(58) Field of Classification Search
CPC .......... B29C 49/6436; B29C 49/42085; B29C 49/42065; B29C 49/42119; B29C 49/42101
See application file for complete search history.

(56) References Cited

U.S. PATENT DOCUMENTS

| | | | |
|---|---|---|---|
| 2003/0077349 A1 | 4/2003 | Derouault et al. ............ 425/145 |
| 2010/0225908 A1 | 9/2010 | Kwirandt .................... 356/239.4 |
| 2016/0229108 A1* | 8/2016 | Aoki .......................... A61L 2/22 |
| 2018/0264707 A1 | 9/2018 | Schill et al. ........ B29C 49/6454 |
| 2019/0091918 A1 | 3/2019 | Klatt et al. .............. B29C 49/64 |

FOREIGN PATENT DOCUMENTS

| | | | | |
|---|---|---|---|---|
| DE | 102014118292 | 6/2016 | ............. | B29C 49/64 |
| DE | 102016005272 | 11/2017 | ............. | B29C 49/64 |
| EP | 0445435 | 12/1990 | ............. | B29C 49/42 |
| EP | 1261471 | 8/2003 | ............. | B29C 49/42 |
| EP | 2253452 | 11/2010 | ............. | B29C 49/54 |
| EP | 3419807 | 3/2021 | | |
| WO | WO-0168350 A1 * | 9/2001 | ......... | B29C 49/6436 |
| WO | 2017178102 | 10/2017 | ............. | B29C 49/12 |
| WO | 2021122712 | 6/2021 | ............. | B29C 49/42 |

OTHER PUBLICATIONS

German Search Report issued in German Patent Appln. Serial No. 10 2021 133 767.6, dated Jul. 4, 2022, with machine English translation, 9 pages.

Partial Search Report issued European Patent Appln. Serial No. 22212497.6-1014, dated May 25, 2023, with machine English translation, 30 pages.

* cited by examiner

APPARATUS AND METHOD FOR PRODUCING PLASTIC CONTAINERS WITH NON-CIRCULAR CROSS-SECTIONS

BACKGROUND OF THE INVENTION

The present invention relates to an apparatus and a method for manufacturing plastic containers and, in particular, plastic containers with non-circular cross-sections. Numerous apparatus and methods for manufacturing plastic containers are known from the prior art. Usually, plastic preforms are heated and formed into containers in forming devices such as blow moulding machines (for example stretch blow moulding machines).

It is known from the state of the art to also blow containers that have cross-sections other than circular, such as oval cross-sections. This is associated with problems, as not only do blow moulds have to be used which have cross-sections other than circular, but alternative heating systems also have to be used for the plastic preforms.

In a heating method known from the prior art, a preferential heating process (preferred heating method) is used for heating plastic preforms for the production of non-cylindrical or insuf-ficiently uniform containers. In this method, a sinusoidal temperature distribution in tangential direction is achieved on the plastic preform. Usually, two thermal maxima and two thermal minima, which are opposite each other, are aimed for.

WO2021122712A1 describes an apparatus for producing oval containers.

In order to produce oval containers of the appropriate quality from it, the plastic preforms must be fed into the blow mould in the correct position. This means that hot preform sides and long container sides as well as cold preform sides and short container sides must be aligned.

The applicant offers a pro-shape process for the production of such containers. In this process, the plastic preform is heated evenly and then cooled again by means of embossing plates on two sides of the plastic preform. For this process as well as for the Preferential Heating, the oriented feeding of plastic preforms into the blow moulds is mandatory.

In the state of the art, different problems occur in some cases. For example, it is sometimes difficult to maintain a transfer angle of +/−10 degrees. In addition, it is sometimes very difficult to determine the rotational position of the plastic preforms.

SUMMARY OF THE INVENTION

The present invention is based on the object of proposing improved apparatus and methods for manufacturing containers with a non-circular cross-section.

An apparatus according to the invention for producing plastic containers has a heating device for heating plastic preforms, wherein the heating device having a transport device which transports the plastic preforms singly (i.e. in particular at a predetermined distance from one another) along a predetermined transport path and this transport device having a plurality of holding devices for holding the plastic preforms and at least one heating unit being provided, which heats the plastic preforms, wherein at least one rotating device is provided which rotates the plastic preforms held by the holding devices during their transport through the heating device (and preferably also at least temporarily during their heating) with respect to their longitudinal directions.

Furthermore, the apparatus has a forming device which forms the plastic preforms transported by the heating device into plastic containers, wherein this forming device has at least one forming station which forms the plastic preforms into the plastic containers by being acted upon by a flowable and, in particular, gaseous medium.

Furthermore, the heating device preferably has an adjusting device (or a rotational position alignment device) which enables an adjustment of a rotational position of the plastic preforms, wherein preferably this adjusting device is arranged at least in sections along the transport path of the plastic preforms.

It should be noted that the term adjusting device is used in the following, but the corresponding device could also be referred to by the technically more accurate term rotary position alignment device.

According to the invention, the apparatus comprises an alignment device which enables an alignment of the rotational position of the plastic preforms with respect to their longitudinal direction relative to the holding devices holding these plastic preforms and/or the apparatus comprises a rotational position alignment device arranged along the transport path which enables an alignment of a rotational position of the holding devices with the plastic preforms arranged thereon.

Preferably, the above-mentioned adjusting device and the alignment device are different devices, which are preferably arranged at a distance from each other along the transport path of the plastic preforms. In a further preferred embodiment, this adjusting device is arranged downstream of the alignment device and/or downstream of the rotary position alignment device in the transport direction of the plastic preforms.

Preferably, the apparatus comprises a first detection device arranged along the transport path of the plastic preforms (and in particular along a rectilinear section of the transport path) for detecting a rotational position of the plastic preforms with respect to their longitudinal direction, wherein particularly preferably the plastic preforms and in particular the plastic preforms to be formed by the forming device and/or the plastic preforms heated by the heating device comprise at least one marking which enables a detection of the rotational position of the plastic preforms.

It is possible that this marking is already present on the produced plastic preforms, but it would also be conceivable and preferred that this marking is applied to the plastic preforms before the heating device, but it would also be possible that the marking is applied during the heating, or even after the heating of the plastic preforms.

Preferably, the detection device is suitable and intended to detect a marking of the plastic preforms in order to determine the rotational position of the plastic preforms.

In a further embodiment according to the invention, this adjusting device extends at least in sections along the transport path of the plastic preforms (and in particular along a straight section of the transport path) and the apparatus preferably has a first detection device arranged along the transport path of the plastic preforms for detecting a rotational position of the plastic preforms with respect to their longitudinal direction.

Preferably, the transport device of the heating device has a circulating transport means on which the holding devices are arranged. Particularly preferably, this transport means is a transport chain. Preferably, the transport device transports the plastic preforms at least in sections along a straight transport path. Preferably, the transport device transports the plastic preforms at least in sections along a curved transport path and in particular along a circularly curved transport path.

Preferably, the plastic preforms are heated during their straight-line transport.

In a further advantageous embodiment, a further transport device is provided between the heating device and the forming device, which transports the plastic preforms. This further transport device can be, for example, a transport wheel or a transport starwheel, on which holding devices for holding the plastic preforms are preferably also arranged. In a further advantageous embodiment, the heating device is an oven and in particular an infrared oven which heats the plastic preforms. Preferably, the heating devices are arranged in a stationary manner and the plastic preforms are transported past them. Preferably, a plurality of heating devices are arranged stationary along the transport path of the plastic preforms. Preferably, these heating devices are arranged along straight sections of the transport path. However, the heating device could also be a microwave oven.

In a further preferred embodiment, a heating power of the individual heating devices is controllable and in particular adjustable. Preferably, the heating power of the individual heating devices is controllable and preferably adjustable independently of each other. Preferably, at least one heating device and preferably a plurality of heating devices each have heating lamps (arranged one above the other in the longitudinal direction of the plastic preforms) which extend along the transport direction of the plastic preforms. Preferably, a heating power of these heating lamps is adjustable.

Preferably, the adjusting device causes all plastic preforms to leave the heating device in a defined rotational position. In a further advantageous embodiment, the detection device has an image recording device.

In a particularly preferred embodiment, the holding devices each have holding elements in the form of mandrels which engage in the mouths of the plastic preforms to hold them. In a preferred embodiment, the apparatus has movement devices which insert the holding mandrels into the plastic preforms. In a preferred embodiment, these holding elements are not only rotatable with respect to a predetermined axis of rotation and/or the longitudinal direction of the plastic preforms, but are preferably also movable in the longitudinal direction of the plastic preforms.

In a preferred embodiment, the apparatus has at least one drive device that causes the individual plastic preforms held by different holding devices to be rotated in the same way with respect to their longitudinal direction. It is conceivable that the rotational movement of the plastic preforms is caused by the movement of the plastic preforms along the transport path, for example, by gears being arranged on the holding devices, which interact with stationary racks.

Preferably, the forming device is suitable and intended for producing plastic containers with a cross-section deviating from a circular cross-section. This can be, for example, a polygonal cross-section, an elliptical cross-section, an oval cross-section and the like.

Preferably, the forming device has a movable and, in particular, rotatable carrier on which a plurality of forming stations are arranged for forming the plastic preforms into the plastic containers. Preferably, these forming stations each have stressing devices which act upon the plastic preforms with a gaseous medium. Preferably, the forming stations each have rod-like bodies which can be inserted into the plastic preforms in order to stretch them in their longitudinal direction.

Preferably, the apparatus comprises an allocation device which allocates to each plastic preform heated by the heating device a specific forming station which forms this plastic preform into a plastic container.

In a further embodiment, the apparats comprises at least one marking device which is suitable and intended for applying a marking to the plastic preforms which enables a rotational position of the plastic preforms to be detected, wherein preferably the marking device is a laser-assisted marking device or a printing device. Preferably, the marking is a permanent marking which preferably remains on the plastic preform throughout the lifetime of the container made from the plastic preform. Preferably, the marking is an optical marking that can be detected without contact.

Preferably, the marking device is provided along the transport path of the plastic preforms through the heating device. Particularly preferably, the marking device is arranged closer to an end of the transport path along which the plastic preforms are heated than at the beginning. Thus, it is possible that the plastic preforms are first transported in a straight line, then the transport direction is reversed in a deflection area and finally the plastic preforms are transported back again. Particularly preferably, the marking device is arranged in this second transport path section in which the plastic preforms are transported back.

Particularly preferably, the marking device is suitable and intended to apply said marking in a threaded area and/or to a support ring of the plastic preforms. Particularly preferably, this can be (at least) a line-shaped marking. In a further preferred embodiment, the marking device applies the marking to an area of the plastic preform which is covered by a container closure and, in particular, a twist-off closure in the later course of the production of the plastic container. Particularly preferably, the marking device applies the marking to a section of the plastic preform that is not stretched and/or expanded during the forming process.

Thus it is possible that in a region of a process curve of the heating device and in particular of the preferential heating orthogonal to a transport direction, for example a chain feed direction, the marking is applied by means of the marking device. Thus, with appropriate adjustment of the marking system, it is possible that the marking is always applied centrally to a hot side of the plastic preform. As mentioned, the marking device is preferably a laser device or a printing device.

In a further preferred embodiment, the apparatus comprises a filling device which is arranged downstream of the forming device in the transport direction of the plastic containers and which is suitable and intended for filling the containers with a flowable product. This product can be a food product, for example, but also other products such as oils, cleaning agents or the like.

In a further preferred embodiment, the apparatus comprises a closing device which is suitable and intended for closing the filled containers. Preferably, the closing device is suitable and intended for attaching screw caps to the containers.

In a further advantageous embodiment, the apparatus has a rotational position correction device which is suitable and intended for changing a rotational position of containers in a defined manner, in particular in order to adapt an actual rotational position (in particular detected by a detection device) to a desired rotational position in this way.

It is possible that this marking is already applied to the plastic preform during production, for example during injection moulding.

In addition, it is also possible that no extra marking is arranged on the plastic preform, but a detection of a significant feature of the plastic preform, for example a thread or a thread pitch (for example the distance of the first lower thread flank to a closure ring) is detected and the position of this marking is measured during the heating process and after the forming process and in this way a transfer angle is measured or calculated.

In a further preferred embodiment, at least one detection device comprises an image capture device adapted to capture an image of the plastic preform in a direction perpendicular to its longitudinal direction. Preferably, this detection device is suitable and intended to capture several lateral images of the plastic preform. In this respect, it would be possible that several image recording devices are provided, which enable an image capture of the plastic preform from several directions. It is also conceivable that mirrors are used to enable the plastic preform to be recorded from several directions.

In a further preferred embodiment, at least one detection device has an image recording device which is suitable for recording an image of the plastic preforms in their longitudinal direction. This detection device is in particular suitable and intended to record an image of a support ring and/or a thread of the container.

This approach can also be implemented using a machine learning system and/or artificial in-telligence. For example, a high number of images of a rotating plastic preform can be cap-tured under different lighting and these images can be evaluated accordingly.

Should a required accuracy not be achievable, for example due to a too flat thread gradient, it would also be possible to optimise by an additional evaluation of vertical interruptions of the thread.

In a preferred embodiment, the adjusting device is a mechanically acting adjusting device. Preferably, the adjusting device has a guide cam which cooperates with at least one first guide roller arranged on the holding device in order to adjust a rotational position of the plastic preforms.

In a preferred embodiment, the holding device has a plate on which this guide roller is arranged, wherein this guide roller preferably being arranged eccentrically, so that a rotary movement of the holding devices and in particular of the plastic preforms held thereon also occurs as a result of pivoting of the guide roller.

Preferably, the holding device (or components of the holding device) is rotatable with respect to an axis of rotation that is parallel to the longitudinal direction of the plastic preforms. Particularly preferably, said guide roller is also rotatable with respect to an axis of rotation that is parallel to the longitudinal direction of the plastic preforms.

Preferably, the adjusting device has at least two and preferably at least three guide curves, which are arranged one after the other along the transport path of the plastic preforms. The first guide curve can be a catch curve, which predetermines the position of the guide roller. In a further embodiment, the second guide curve is a guide curve that causes the guide roller to be aligned.

In a further preferred embodiment, at least one and particularly preferably several of these guide curves are arranged in a straight section of the transport path. Preferably at least one of these guide curves and particularly preferably several of these guide curves run in a straight line.

In a further advantageous embodiment, at least one guide curve is adjustable in order to change the rotational position of the plastic preform. Preferably, this guide curve can be adjusted as a function of a rotational position of the plastic preform and, in particular, a rotational position which is or was determined by the at least one detection device. Particularly preferably, this guide curve can be changed perpendicularly to the transport path of the plastic preform and in particular in a horizontal plane. Particularly preferably, said guide curve is linearly displaceable, and in this way an angular position of the guide roller can be changed.

In a particularly preferred embodiment, the above-mentioned detection device is arranged along the adjusting device. This means that the rotational position of the plastic preforms is detected while they are aligned with said guide curves.

In a further advantageous embodiment, the detection device is suitable and intended to detect a position of the guide roller with respect to a longitudinal direction of the holding devices and/or with respect to a longitudinal direction of the plastic preform.

In this case, it is possible that the guide roller or pivot roller (for example, the switching time of a sensor) is adjusted with a coarse or fine cycle in order to make a statement as to whether a spindle (or a holding device) is aligned in front of or behind all (viewed in the transport direction of the plastic preforms).

This is a preferred solution. Alternatively, the time interval between detected pivot rollers or guide rollers could also be considered, as it can be assumed that most spindles are correctly oriented. In this way, it could be concluded from a too short time interval compared to a target time interval between two detected pivot rollers that the last detected pivot roller was in-correctly oriented in a leading manner. In addition, it would also be possible to conclude from a time interval that is too long compared to the target time interval between two detections that the last detected pivot roller and/or spindle is now correctly aligned again.

In a further advantageous embodiment, the apparatus has a processor device which is suitable and intended for determining a statement about a characteristic state of an adjusting device from values output by the detection device. For example, it can be determined that an accumulation of fault conditions occurs. In this way, it is possible to conclude, for example, that the guide roller or the guide curves are worn.

In a further advantageous embodiment, the detection device is suitable and intended for contactless detection of a fault condition of the adjusting device.

In a further advantageous embodiment, the adjusting device has a first adjusting means which is suitable and intended for moving and/or pivoting the guide roller into a first predetermined position with respect to the longitudinal direction. It is possible that this first adjusting means is designed in a comb-like and/or brush-like manner and serves to pre-orientate the guide rollers or pivot rollers to a predetermined angle.

In a further advantageous embodiment, the adjusting device comprises a second adjusting means which is preferably arranged downstream of the first adjusting means in the transport direction of the plastic preforms and which is suitable and intended for moving or pivoting the guide roller into a first predetermined position with respect to the longitudinal direction.

In a preferred embodiment, the marking of the plastic preform is arranged in a region of a mouth and/or in a bottom region of the plastic preform, in particular a bottom tip region. Preferably, the mouth can be arranged in an area of the plastic preform that is not stretched during the forming process or also in an area that is not stretched during the forming process (in particular the threaded area and/or the mouth area).

Preferably, the marking is applied in an area along its transport path in which no rotation of the plastic preform with respect to its longitudinal direction takes place. Preferably, the marking is applied in an area along its transport path in which a rotation of the plastic preform with respect to its longitudinal direction is prevented, in particular in an area of the above-mentioned curves and/or the adjusting device.

The marking can be applied by means of a laser, a stamping tool or an imprint.

The advantage of placing the marking in a bottom tip region is that it facilitates an axial inspection, which is usually more accurate than a radial inspection. An inspection unit for carrying out this inspection is known from DE 10 2006 047150A1.

In a further preferred embodiment, the alignment device is arranged in the area of a feeding device which feeds the plastic preforms to the heating device.

This feeding device can be, for example, a so-called feeding starwheel or a feeding wheel, which feeds the plastic preforms to the heating device.

Particularly preferably, the feeding device is a separating device which separates the plastic preforms to be fed and/or creates a gap between them. Particularly preferably, the separating device is a single-cycle starwheel which preferably has recesses on its outer circumference for receiving the individual plastic preforms. In a further preferred embodiment, however, both a separating device and an alignment device such as an alignment carousel downstream of this separating device can be provided.

In a further preferred embodiment, the alignment device has an inspection device which inspects the plastic preforms and which, in particular, determines a rotational position of the plastic preforms with respect to their longitudinal directions.

This inspection device preferably has an image recording device which records a spatially resolved image of the plastic preforms and in this way determines their rotational position. This can be done by means of the above-mentioned marking of the plastic preforms.

In a preferred embodiment, this inspection device is arranged in the area of the feeding device, for example in the area of a saw-tooth starwheel. However, it would also be possible for this inspection device to be arranged in an area of the heating section of the plastic preforms or in the above-mentioned deflection area in which the direction of movement of the plastic preforms is reversed.

In a preferred embodiment, the alignment device has a position-locking device which locks a rotational position of the plastic preforms (in particular temporarily).

It would thus be possible for the plastic preform(s) to be fed to an alignment carousel via an infeed stop and a saw-tooth starwheel.

In this alignment carousel, the plastic preform can first be arranged on a holding device and, in particular, placed on a holding mandrel. The rotational position of the plastic preform is then preferably detected. In a further step, the holding device and in particular the holding mandrel is preferably aligned with regard to its rotational position.

Preferably, the plastic preform is then transferred from the holding device, in particular the holding mandrel, to a further holding device and in particular a gripping clamp. Preferably, the plastic preform is then transferred from this gripping clamp to one of the above-mentioned holding devices of the heating device and in particular to a holding mandrel.

In a preferred embodiment, the alignment device has first holding devices for holding the plastic preforms. Preferably, these holding devices are holding mandrels which can be inserted into the mouths of the plastic preforms. Particularly preferably, these first holding devices are rotatable with respect to the longitudinal direction of the plastic preforms.

Preferably, the alignment device has second holding devices. Preferably, these second holding devices are gripping clamps which grip the plastic preforms (especially in the area of their mouths).

In a preferred embodiment, the alignment device has a rinsing device for rinsing the plastic preforms. Such devices often have rinsing devices which rinse the plastic preforms before they are heated, for example with rinsing air. It is proposed here that this rinsing device (or the transport device on which it is arranged) is also used for aligning the plastic preforms.

In a further preferred embodiment, the alignment device comprises a rotating device which rotates the plastic preforms and/or the holding device with respect to the longitudinal axis of the plastic preforms to change a relative rotational position of the plastic preforms with respect to the holding devices.

Here, too, it is possible for an inspection device to first detect the rotational position of the plastic preforms, which can be done, for example, in the area of the saw-tooth starwheel mentioned above. Optionally, the rotational position of the plastic preforms can be secured.

In a further step, the holding device, for example the holding mandrel, can be rotated to a predetermined rotational position in order to achieve an oriented attachment of the plastic preform.

In a preferred embodiment, therefore, a position and, in particular, a rotational position of the holding device, in particular of a holding mandrel in the region in which it is inserted into the plastic preform, can be adjusted.

In this way, an offset angle of the plastic preform or its marking to a pivot roller and/or the adjusting device can be adjusted.

In this way, the plastic preforms can be attached in an oriented manner (with regard to the rotational position).

In a further preferred embodiment, the heating device has at least one drive device for rotating the holding devices, and preferably this drive device can be at least partially decoupled from the holding device with respect to this rotary movement.

This decoupling preferably allows the holding devices to rotate freely. Preferably, this decoupling is possible at least in the area of a deflection wheel of the heating device.

Also in this embodiment, an orientation of the plastic preforms is possible, but especially during their transport through the heating device. Preferably, a reorientation in the area of the deflection takes place during heating.

In this embodiment, the plastic preform can first be arranged in any rotational position on the holding device and, in particular, placed on a holding mandrel. Preferably, a standard heating process is first carried out in this orientation, i.e. in particular the plastic preform is guided past a first portion of heating units. In this way, a standard heating process is preferably present here, in particular in a chain feed of the heating device.

In the area of the deflection, the rotary movement is preferably decoupled or a freewheel of the rotation is used. Preferably, the rotation of the holding device with the plastic preform arranged on it is decoupled from a drive. As mentioned above, the rotary movement can be generated, for example, by the apparatus having a rack opposite which gears of the individual holding device roll. This coupling can, as mentioned, be temporarily decoupled, in particular for the purpose of alignment.

During this decoupling, the holding device and/or the plastic preform are preferably rotated until a target position is reached. For this purpose, it is possible that first an inspection and then a reorientation takes place, for example by means of drives. Optionally, a rotational position lock can also be provided here, which secures the rotational position of the holding device and/or the plastic preform (which is arranged in particular in a rotationally fixed manner on the holding device).

Additionally or alternatively, it would also be possible for the holding device and/or the plastic preform to rotate up to a (mechanical) stop in order to achieve a defined position. Optionally, a (particularly mechanical) position lock for the rotational position can also be provided here.

The present invention is further directed to a method for manufacturing plastic containers, wherein plastic preforms are heated by a heating device, wherein the heating device comprises a transport device which transports the plastic preforms individually along a predetermined transport path, and wherein this transport device comprises a plurality of holding devices which hold the plastic preforms, and wherein at least one heating unit is provided which heats the plastic preforms, and wherein furthermore a rotating device rotates the plastic preforms held by the holding devices during their transport through the heating device with respect to their longitudinal directions and wherein furthermore a forming device forms the plastic preforms transported by the heating device into plastic containers, wherein this heating device comprises at least one forming station which forms the plastic preforms into the plastic containers by the action of a flowable (and in particular gaseous) medium.

Furthermore, the heating device preferably comprises an adjusting device which changes a rotational position of the plastic preforms (in particular during their transport along their transport path) and a first detection device arranged along the transport path of the plastic preforms detects the rotational position of the plastic preforms with respect to their longitudinal direction.

According to the invention, an alignment device enables an alignment of the rotational position of the plastic preforms with respect to their longitudinal direction relative to the holding devices holding these plastic preforms and/or a rotational position alignment device enables an alignment of the rotational position of the holding devices with the plastic preforms arranged thereon.

In an advantageous method, the plastic preforms heated by the heating device have at least one marking which enables the rotational position of the plastic preforms to be detected.

In a further advantageous method, a second detection device arranged along the transport path detects a rotational position of the plastic preforms.

In an advantageous method, a marking device applies a marking to the plastic preforms which enables the rotational position of the plastic preforms with respect to their longitudinal direction to be detected, wherein the marking preferably being applied during heating of the plastic preforms.

In a further advantageous embodiment, the rotational position of the plastic preform is changed by means of a mechanical adjusting device and in particular by means of at least one and preferably several guide curves. Preferably, this guide curve is adjusted as a function of a rotational position of the plastic preform. Particularly preferably, the rotational position of the plastic preform is determined by the at least one detection device.

In a further preferred method, the marking is applied in an area of the adjusting device, i.e. in particular while the plastic preforms are being transported through the adjusting device.

Preferably, in the area of the preferential heating process curve, i.e. preferably while the preferential heating spindles are guided in the curve and thus their orientation is known a marking is applied, in particular in the tip area of the plastic preforms, in particular with a laser or printing process or mechanically, e.g. through a stamp.

In a further preferred method, a detection device detects a position of the marking and preferably detects the position of the marking immediately before the forming process or after the forming process.

In a further preferred method, the orientation of the rotational position of the plastic preforms with respect to their longitudinal direction relative to the holding devices holding these plastic preforms takes place before the heating of the plastic preforms, or the rotational position orientation of the holding devices with the plastic preforms arranged thereon takes place during the transport of the plastic preforms through the heating device.

In a further preferred method, the plastic preforms are aligned with regard to their rotational position while they are being transported by means of a feeding device and, in particular, by means of a saw-tooth starwheel.

Particularly preferably, an inspection of the plastic preforms takes place within the scope of this alignment, in particular in order to determine their rotational position with respect to their longitudinal axis.

Preferably, the plastic preforms are reoriented and, in particular, rotated with respect to their longitudinal directions. Optionally, the plastic preforms can also be secured in position (especially mechanically).

Alternatively, it would also be possible for the plastic preforms to be rotated to a mechanical stop in order to achieve a defined position and/or rotational orientation. Here, too, it would be possible to secure the position (especially mechanically).

In a preferred embodiment, a holding device, such as a mandrel or a spindle, is guided by means of a pivot roller oriented to an attach point at which it is inserted into the plastic preforms. In this way, a rotational position of this holding device or holding mandrel can be kept constant.

BRIEF DESCRIPTION OF THE DRAWINGS

Further advantages and embodiments can be seen in the attached drawings.

In the drawings.

DETAILED DESCRIPTION OF THE INVENTION

Figure 1:
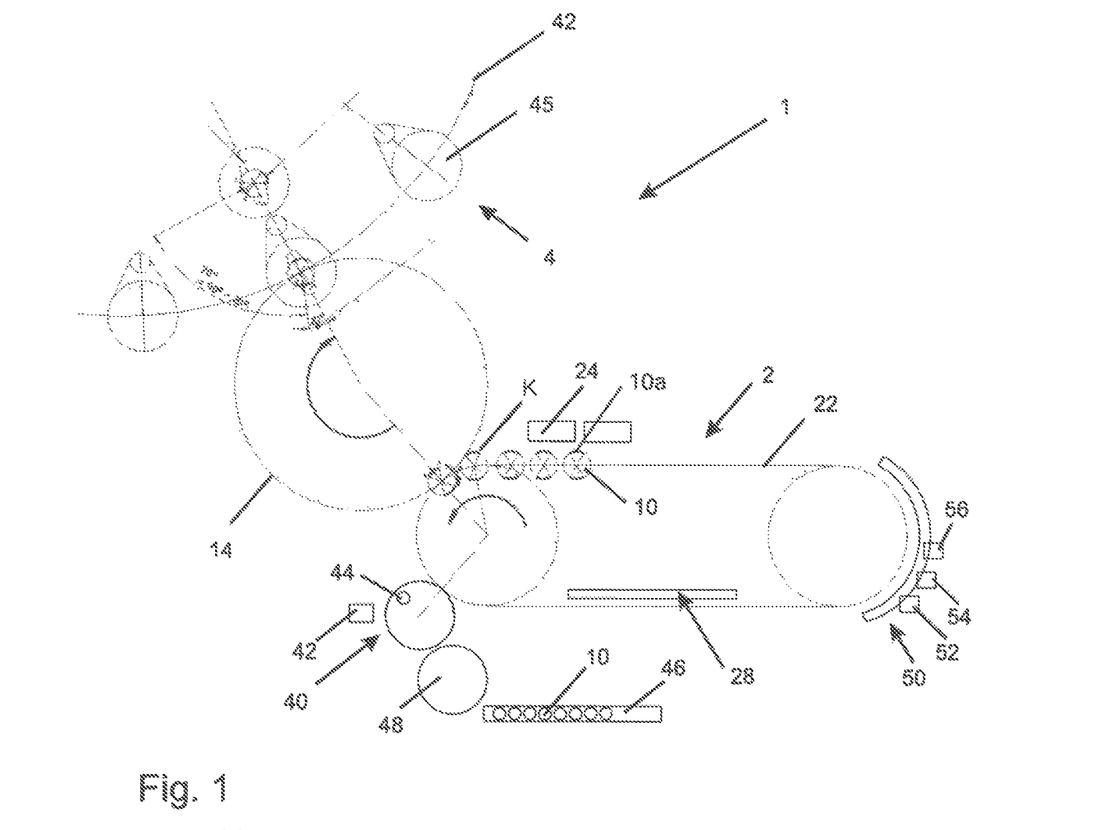
FIG. 1 shows a schematic representation of an apparatus according to the invention.

FIG. 1 shows a schematic representation of an apparatus 1 for manufacturing containers.

The reference sign 2 refers to a heating device such as an oven which heats plastic preforms 10. Preferably, this is an infrared heating device. This heating device has a transport device 22, shown only schematically, which is designed here as a circulating chain on which a plurality of holding devices (not shown) are arranged for holding the plastic preforms 10.

The reference sign 24 indicates a heating device, such as a heating box, which is preferably arranged stationary with respect to the transport device 22 and past which the plastic preforms are transported. In a preferred embodiment, heating devices are also provided on the inside of the transport path.

In a preferred embodiment, the heating device also has cooling devices which are suitable for cooling a surface of the plastic preforms, for example by applying air. In this way, uniform heating of the plastic preforms along their wall can be achieved.

As mentioned at the beginning, the plastic preforms are to be heated at preferred areas 10a, here at the areas shown in FIG. 1. For this purpose, the plastic preforms are aligned in their rotation so that some sections 10a are heated more than others.

The plastic preforms heated in this way are transferred by means of a transport device 14, such as a transport starwheel, to the forming device designated in its entirety as 4. This has a plurality of forming stations 45, which are arranged on a transport device 42 like a blowing wheel. The plastic preforms are fed into these forming stations or blow moulds and formed into containers.

Several transport devices such as transport starwheels, for example at least two and preferably at least three transport devices, can also be arranged between the heating device.

In the area marked K, a correction of the rotational position of the plastic preforms can be made. In the forming device 4, the more heated surfaces of the plastic preforms are aligned with the respective longer sides of the blow moulds. Preferably, the plastic preforms are aligned in such a way that a parting side or parting plane is arranged on the narrow side of the container. The reference sign 28 roughly schematically indicates a drive device or rotating device for rotating the plastic preforms 10 with respect to their longitudinal directions. This drive device can, for example, be designed as a rack which meshes with gears (not shown) which are assigned to the individual holding devices of the plastic preforms.

Preferably, the holding devices are each equipped with a coupling device (not shown), which can cancel a coupling of the rotational movement of the gear and the individual holding elements such as holding mandrels, so that at least in sections the holding devices 26a (cf. FIG. 7) are freely rotatable.

The reference sign 40 indicates an alignment device which serves to align the rotational position of the plastic preforms with respect to the holding devices holding them. This alignment device 40 preferably has an inspection device 42 which detects a rotational position of the plastic preforms 10. In addition, a rotational device is provided which changes the rotational position of the plastic preforms, in particular turns the plastic preforms into a desired rotational position.

The reference sign 46 indicates a preform feed device such as a feed rail, which feeds the plastic preforms 10 one after the other to the alignment device 40. The reference sign 48 indicates a separating device which separates the plastic preforms 10 fed in a row. This separating device can be a saw-tooth starwheel.

The reference sign 50 indicates a rotary position alignment device, which can be provided instead of or in addition to the alignment device. This rotary position alignment device is preferably arranged in a deflection area of the heating device 2. The reference sign 52 indicates an inspection device which detects a rotational position of the plastic preforms 10 (held by the holding devices such as, in particular, holding mandrels).

The reference sign 54 indicates a decoupling device which at least briefly removes a coupling between the drive device 28 and the holding devices so that the plastic preforms are free with respect to their longitudinal directions. The reference sign 56 indicates a rotational position adjustment device which adjusts a rotational position of the plastic preforms to a desired position.

However, it would also be possible that the drive device, such as a rack, is not present in the area of the deflection and for this reason the holding devices with the plastic preforms arranged on them can rotate freely.

Figure 2:
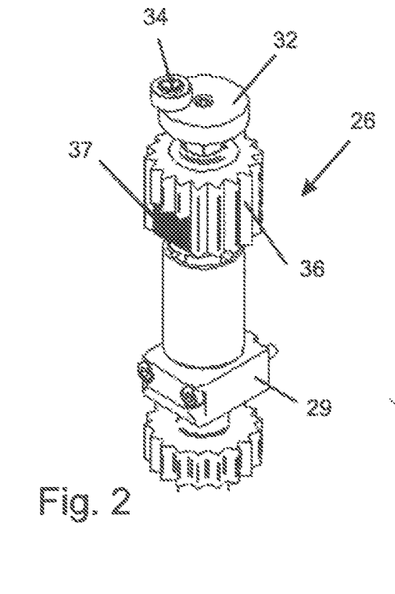
FIG. 2 shows a representation of a holding device for holding the plastic preforms.

FIG. 2 shows a representation of a holding device 26, which has a carrier 29 that can be arranged on a circulating transport means such as a transport chain. The reference sign 32 indicates a rotatable plate on which a guide roller 34 is arranged. This plate is rotatable with respect to the longitudinal direction L. This longitudinal direction also corresponds to the longitudinal direction of the plastic preform (not shown).

The reference sign 36 indicates a gear or a gear ring which can rotate with respect to or engage with a (not shown) stationary rack. Between this gear ring and the (not shown) holding mandrel, a coupling device (not shown) can be arranged, which can decouple the rotary movement of the gear ring from the rotary movement of the plastic preterm.

The reference sign 37 indicates an alignment surface which serves to pre-direct the rotational position of the plastic preform. In this way, a defined rotational position of the plastic preform can be achieved.

Figure 3:
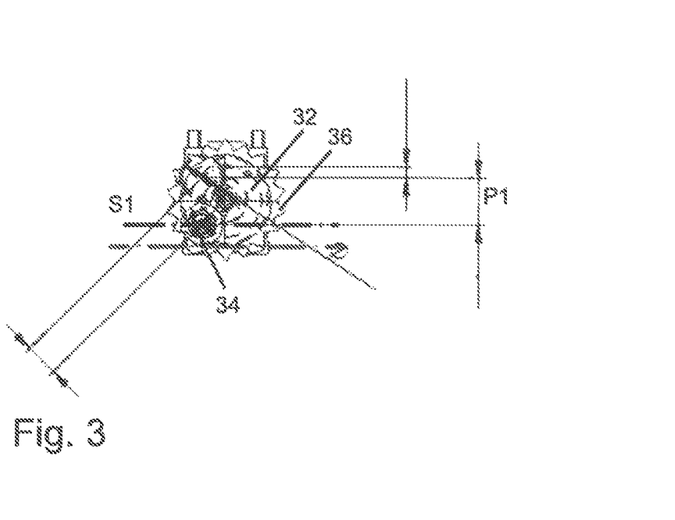
FIG. 3 shows a top view of the holding device from FIG. 2.

FIG. 3 shows a top view of the holding device shown in FIG. 2. Here again the guide roller 34 is provided, which is arranged on the rotatable plate 32. The gear 36 can also be seen.

The reference sign P1 indicates a travel path of a corresponding guide curve when an angular correction, for example by 90°, is to be made. The reference sign S1 indicates a curve position for directional heating or preferred heating of certain areas of the plastic preform.

Figures 4, 5, 6:
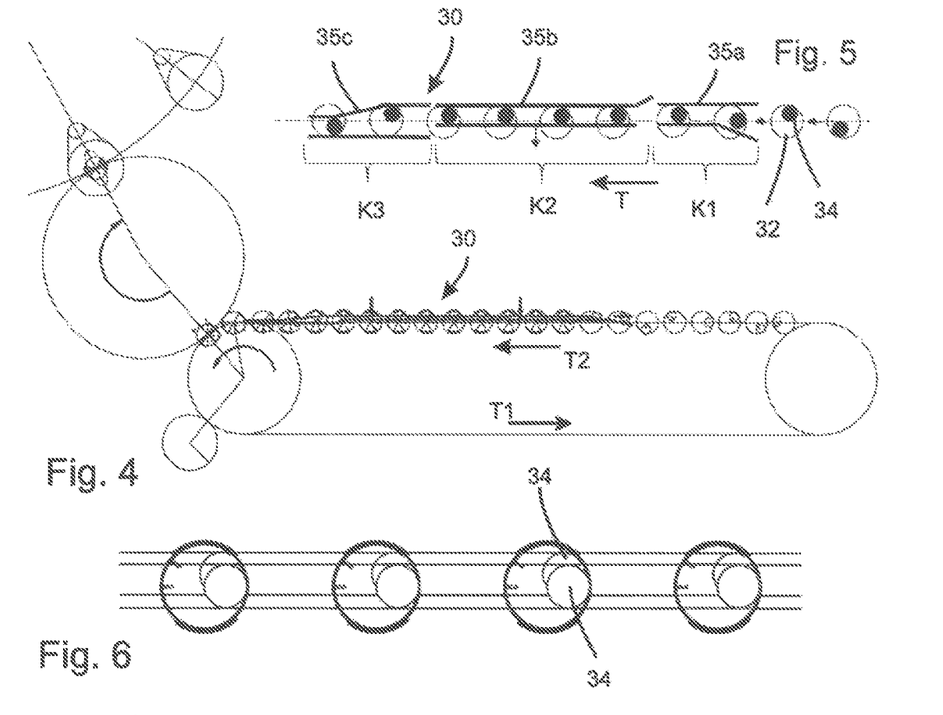
FIG. 4 shows a detailed representation of the heating device.
FIG. 5 shows a representation of the adjusting device for changing the rotational position of the plastic preforms.
FIG. 6 shows an illustration for changing the rotational position of the plastic preforms.

FIG. 4 shows a detailed representation of the apparatus shown in FIG. 1. The reference sign 30 indicates an adjusting device which serves to align the plastic preforms or their rotational position. Preferably, this adjusting device is arranged in the second half of the transport path along which the plastic preforms are transported during their heating.

FIG. 5 shows a detailed representation of this adjusting device. Here, it has curve segments 35a, 35b and 35c arranged one after the other along the transport path T. The reference sign 35a indicates a catch curve which is suitable and intended for catching the guide roller 34 or gripping it in any position. In this catch curve a pre-alignment of the guide roller 34 is carried out. This catch curve is followed by a process curve 35b, within which the plastic preforms are preferably heated in the given position.

The process curve 35b is followed by a transfer curve 35c, which aligns the rotational position of the plastic preforms in a desired shape in order to transfer the plastic preforms to a further transport device 14. In a preferred embodiment, the positions of the process curve and/or the transfer curve can be changed in order to adapt the rotational position to different process conditions.

In a further preferred embodiment, the apparatus has a drive device to adjust the process curve and/or the transfer curve. For example, an electric motor drive device can be provided, which causes an adjustment of the process curve and/or the transfer curve.

FIG. 6 illustrates the transfer curve by means of which a spindle rotation is initiated in a clockwise direction (top view). As a result, the oven-outer side of the plastic preform in the blow mould will be oriented against the direction of rotation of the blow wheel.

Figure 7:
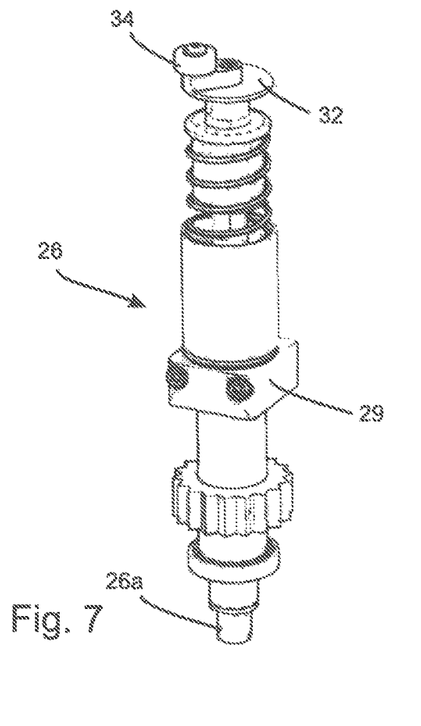
FIG. 7 shows a further illustration of a holding device for holding the plastic preforms.

FIG. 7 shows a further illustration of the holding device. Here again, the guide roller 34 is shown on the rotatable plate 32. The reference sign 26A indicates a mandrel which engages in the mouths of the plastic preforms in order to hold them in place. This mandrel 26a can also have clamping mechanisms which serve to clamp the plastic preform.

Figure 8:
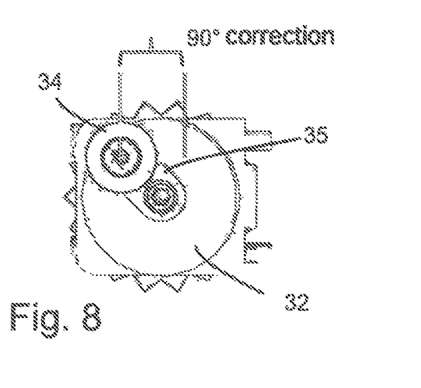
FIG. 8 shows a top view of the holding device from FIG. 7.

FIG. 8 shows a top view of the holding device shown in FIG. 7. Here again, the guide roller 34 is arranged on an arm 35, which in turn is attached to the plate 32. The guide curves allow a 90° correction of the rotational position of the spindle drive or the guide roller.

Due to the preferably adjustable or shiftable process curve 35b (cf. FIG. 5), all concepts described below can also be used to control or adjust the average transfer angle. For this purpose, the drive of the process curve is preferably readjusted depending on a measured transfer angle.

In this way, for example, process control of preferential heating machines can be carried out (for example, to counteract a drift of the transfer angle during the warm-up of the oven).

However, new customer objects can also be used on corresponding machines that allow preferential heating.

The applicant reserves the right to claim all features disclosed in the application documents as essential to the invention, provided they are individually or in combination new compared to the prior art. Furthermore, it is pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

The invention claimed is:

1. An apparatus for producing plastic containers, having a heating device fir heating plastic preforms, wherein the heating device has a transporting device configured to transport the plastic preforms individually along a predetermined transport path, and this transport device has a plurality of holding devices configured for holding the plastic preforms, and at least one heating unit is provided configured to heat the plastic preforms, wherein further a rotating device also being provided, configured to rotate the plastic preforms held by the holding devices during their transport through the heating device with respect to their longitudinal direction, and with a forming device configured to form the plastic preforms transported by the heating device into plastic containers, wherein this forming device has at least one forming station configured to form the plastic preforms into the plastic containers by the action of a flowable medium, wherein the apparatus has an alignment device configured to align the rotational position of the plastic preforms with respect to their longitudinal direction relative to the holding devices holding these plastic preforms and/or the apparatus has a rotational position alignment device which is arranged along the transport path and which is configured to align a rotational position of the holding devices with the plastic preforms arranged thereon wherein the heating device has an adjusting device configured to adjust a rotational position of the plastic preforms and the adjusting device has at least two guide curves, which are arranged one after another along the transport path of the plastic preforms, and wherein at least one guide curve is adjustable in order to change the rotational position of the plastic preform.

2. The apparatus according to claim 1, wherein the adjusting device is arranged downstream of the aligning device and/or downstream of the rotational position alignment device in the transport direction of the plastic preforms.

3. The apparatus according to claim 1, wherein the forming device is configured for producing plastic containers with a cross-section deviating from a circular cross-section.

4. The apparatus according to claim 1, wherein the adjusting device is a mechanically acting adjusting device.

5. The apparatus according to claim 1, wherein the alignment device is arranged in the region of a feed device which feeds the plastic preforms to the heating device.

6. The apparatus according to claim 1, wherein the alignment device has an inspection device configured to inspect the plastic preforms.

7. The apparatus according to claim 1, wherein the alignment device has a position-securing device configured to lock a rotational position of the plastic preforms.

8. The apparatus according to claim 1, wherein the alignment device has first holding devices configured for holding the plastic preforms, wherein these first holding devices are designed as holding mandrels configured for insertion into the mouths of the plastic preforms.

9. The apparatus according to claim 1, wherein the alignment device comprises a rinsing device configured for rinsing the plastic preforms.

10. The apparatus according to claim 1, wherein the alignment device comprises a rotating device configured to rotate the plastic preforms and/or the holding devices with respect to the longitudinal axis of the plastic preforms in order to change a relative rotational position of the plastic preforms with respect to the holding devices.

11. The apparatus according to claim 1, wherein the heating device has at least one drive device configured to rotate the holding devices, and the drive device is configured to be decoupled at least in sections from the holding device with regard to this rotary movement.

12. A method for producing plastic containers, wherein plastic preforms are heated by a heating device, wherein the heating device has a transport device which transports the plastic preforms singly along a predetermined transport path, and this transport device has a plurality of holding devices which hold the plastic preforms, and at least one heating unit being provided, which heats the plastic preforms and wherein furthermore a rotating device rotates the plastic preforms held by the holding devices during their transport through the heating device with respect to their longitudinal direction and wherein a forming device forms the plastic preforms transported by the heating device into plastic containers, wherein this forming device has at least one forming station which forms the plastic preforms into the plastic containers by being acted upon by a flowable medium, wherein an alignment device enables an alignment of the rotational position of the plastic preforms with respect to their longitudinal direction relative to the holding devices holding these plastic preforms and/or a rotational position alignment device enables an alignment of the rotational position of the holding devices with the plastic preforms arranged thereon, wherein the rotational position of the plastic preforms is adjusted by a mechanical adjusting device which is arranged downstream of the alignment device in the transport direction of the plastic preforms and by at least one guide curve, and wherein the at least one guide curve is adjustable in order to change the rotational position of the plastic preform.

13. The method according to claim 12, wherein this guide curve is adjusted as a unction of a rotational position of the plastic preforms.

14. The method according to claim 12, wherein the alignment of the rotational position of the plastic preforms with respect to their longitudinal direction relative to the holding devices holding these plastic preforms takes place before the heating of the plastic preforms or the rotational position alignment of the holding devices with the plastic preforms arranged thereon takes place during the transport of the plastic preforms through the heating device.

15. The apparatus according to claim 1, wherein a first guide curve is a catch curve, which predetermines the position of the guide roller and/or the second guide curve is a guide curve that causes the guide roller to be aligned.

16. The apparatus according to claim 1, wherein this guide curve can be adjusted as a function of a rotational position of the plastic preform and a rotational position which is or was determined by at least one detection device.

17. The apparatus according to claim 16, wherein the detection device is arranged along the adjusting device, wherein the rotational position of the plastic preforms is detected while they are aligned with said guide curves and/or the detection device is suitable and intended for contactless detection of a fault condition of the adjusting device.

18. The method according to claim 12, wherein the plastic preform are fed to an alignment carousel via an infeed stop and a saw-tooth starwheel, wherein in the alignment carousel, the plastic preform is first arranged on a holding device and placed on a holding mandrel, wherein in a further step, the holding mandrel is aligned with regard to its rotational position.

19. The apparatus according to claim 1, wherein the alignment device has second holding devices, wherein these second holding de-vices are gripping clamps which grip the plastic preforms.

20. The apparatus according to claim 10, wherein the holding device can be rotated to a predetermined rotational position in order to achieve an oriented attachment of the plastic preform and/or a position and a rotational position of the holding device, in the region in which the holding device is inserted into the plastic preform, can be adjusted.

\* \* \* \* \*